United States Patent
Falardeau et al.

(10) Patent No.: US 7,809,707 B2
(45) Date of Patent: Oct. 5, 2010

(54) SYSTEM AND METHOD FOR IDENTIFYING ELEMENT USAGE IN A DEEP ELEMENT STRUCTURE

(75) Inventors: Simon Falardeau, Laval (CA); Dai Nguyen, Brossard (CA); Jerome Poulin, Montreal (CA)

(73) Assignee: SAP AG, Walldorf (DE)

( * ) Notice: Subject to any disclaimer, the term of this patent is extended or adjusted under 35 U.S.C. 154(b) by 370 days.

(21) Appl. No.: 11/880,590

(22) Filed: Jul. 23, 2007

(65) Prior Publication Data

US 2009/0030871 A1 Jan. 29, 2009

(51) Int. Cl.
*G06F 7/00* (2006.01)
(52) U.S. Cl. .................................. 707/706; 707/726
(58) Field of Classification Search ............... 707/1–10, 707/705–726, 781–789
See application file for complete search history.

(56) References Cited

U.S. PATENT DOCUMENTS

| | | | |
|---|---|---|---|
| 4,752,877 A | 6/1988 | Roberts et al. |
| 5,315,508 A | 5/1994 | Bain et al. |
| 5,400,253 A | 3/1995 | O'Connor |
| 5,444,820 A | 8/1995 | Tzes et al. |
| 5,546,507 A | 8/1996 | Staub |
| 5,615,109 A | 3/1997 | Eder |
| 5,701,400 A | 12/1997 | Amado |
| 5,758,327 A | 5/1998 | Gardner et al. |
| 5,870,716 A | 2/1999 | Sugiyama et al. |
| 5,930,771 A | 7/1999 | Stapp |
| 5,970,490 A | 10/1999 | Morgenstern |
| 5,974,391 A | 10/1999 | Hongawa |
| 5,974,407 A | 10/1999 | Sacks |
| 5,982,383 A | 11/1999 | Kumar et al. |
| 5,999,914 A | 12/1999 | Blinn et al. |
| 6,029,139 A | 2/2000 | Cunningham et al. |
| 6,064,984 A | 5/2000 | Ferguson et al. |
| 6,260,024 B1 | 7/2001 | Shkedy |
| 6,341,351 B1 | 1/2002 | Muralidhran et al. |
| 6,405,181 B2 | 6/2002 | Lent et al. |
| 6,405,191 B1 | 6/2002 | Bhatt et al. |
| 6,505,093 B1 | 1/2003 | Thatcher et al. |
| 6,507,851 B1 | 1/2003 | Fujiwara et al. |
| 6,701,299 B2 | 3/2004 | Kraisser et al. |

(Continued)

FOREIGN PATENT DOCUMENTS

JP 2004-030343 A 1/2004

(Continued)

OTHER PUBLICATIONS

U.S. Appl. No. 60/374,892, filed Apr. 22, 2002, Krajec.

(Continued)

*Primary Examiner*—Wilson Lee
(74) *Attorney, Agent, or Firm*—Foley & Lardner LLP

(57) ABSTRACT

A system for identifying usage of a target data element including both direct and indirect usage, within a data element structure where the target data element may have more than one parent data element. The system includes a usage processing engine configure to identify direct and indirect usage data elements for the target data element within the data element structure and a user interface configured to display the direct and indirect usage data elements for the target element in a hierarchical structure.

26 Claims, 6 Drawing Sheets

U.S. PATENT DOCUMENTS

| | | |
|---|---|---|
| 6,725,204 B1 | 4/2004 | Gusley |
| 6,868,528 B2 * | 3/2005 | Roberts ..................... 715/853 |
| 6,910,017 B1 | 6/2005 | Woo et al. |
| 6,980,966 B1 | 12/2005 | Sobrado et al. |
| 7,031,951 B2 | 4/2006 | Mancisidor et al. |
| 7,080,030 B2 | 7/2006 | Eglen et al. |
| 7,082,408 B1 | 7/2006 | Baumann et al. |
| 7,092,929 B1 | 8/2006 | Dvorak et al. |
| 7,100,083 B2 | 8/2006 | Little et al. |
| 7,117,165 B1 | 10/2006 | Adam et al. |
| 7,124,098 B2 | 10/2006 | Hopson et al. |
| 7,124,984 B2 | 10/2006 | Yokouchi et al. |
| 7,139,731 B1 | 11/2006 | Alvin |
| 7,197,559 B2 | 3/2007 | Goldstein et al. |
| 7,275,048 B2 | 9/2007 | Bigus et al. |
| 7,546,522 B2 | 6/2009 | Tolle et al. |
| 2001/0019778 A1 | 9/2001 | Gardaz et al. |
| 2001/0032130 A1 | 10/2001 | Gabos et al. |
| 2001/0039517 A1 | 11/2001 | Kawakatsu |
| 2001/0049634 A1 | 12/2001 | Stewart |
| 2002/0013731 A1 | 1/2002 | Bright et al. |
| 2002/0023500 A1 | 2/2002 | Chikuan et al. |
| 2002/0026368 A1 | 2/2002 | Carter, III |
| 2002/0059108 A1 | 5/2002 | Okura et al. |
| 2002/0072986 A1 | 6/2002 | Aram |
| 2002/0073114 A1 | 6/2002 | Nicastro et al. |
| 2002/0078159 A1 | 6/2002 | Petrogiannis et al. |
| 2002/0087389 A1 | 7/2002 | Sklarz et al. |
| 2002/0107713 A1 | 8/2002 | Hawkins |
| 2002/0116241 A1 | 8/2002 | Sandhu et al. |
| 2002/0123930 A1 | 9/2002 | Boyd et al. |
| 2002/0138290 A1 | 9/2002 | Metcalfe et al. |
| 2002/0147668 A1 | 10/2002 | Smith et al. |
| 2002/0152128 A1 | 10/2002 | Walch et al. |
| 2002/0156772 A1 | 10/2002 | Chau et al. |
| 2002/0184116 A1 | 12/2002 | Tam et al. |
| 2003/0023500 A1 | 1/2003 | Boies et al. |
| 2003/0028393 A1 | 2/2003 | Coulston et al. |
| 2003/0028437 A1 | 2/2003 | Grant et al. |
| 2003/0046120 A1 | 3/2003 | Hoffman et al. |
| 2003/0046195 A1 | 3/2003 | Mao |
| 2003/0050852 A1 | 3/2003 | Liao et al. |
| 2003/0074269 A1 | 4/2003 | Viswanath |
| 2003/0120686 A1 | 6/2003 | Kim et al. |
| 2003/0126024 A1 | 7/2003 | Crampton et al. |
| 2003/0144916 A1 | 7/2003 | Mumm et al. |
| 2003/0149631 A1 | 8/2003 | Crampton et al. |
| 2003/0149674 A1 | 8/2003 | Good et al. |
| 2003/0158791 A1 | 8/2003 | Gilberto et al. |
| 2003/0167265 A1 | 9/2003 | Corynen |
| 2003/0171998 A1 | 9/2003 | Pujar et al. |
| 2003/0172007 A1 | 9/2003 | Helmolt et al. |
| 2003/0200150 A1 | 10/2003 | Westcott et al. |
| 2003/0208365 A1 | 11/2003 | Avery et al. |
| 2003/0229502 A1 | 12/2003 | Woo |
| 2004/0010463 A1 | 1/2004 | Hahn-Carlson et al. |
| 2004/0078727 A1 | 4/2004 | Little et al. |
| 2004/0098358 A1 | 5/2004 | Roediger |
| 2004/0119713 A1 | 6/2004 | Meyringer |
| 2004/0122689 A1 | 6/2004 | Dailey et al. |
| 2004/0162763 A1 | 8/2004 | Hoskin et al. |
| 2004/0172321 A1 | 9/2004 | Vemula et al. |
| 2004/0186765 A1 | 9/2004 | Kataoka |
| 2004/0186783 A1 | 9/2004 | Knight et al. |
| 2004/0210489 A1 | 10/2004 | Jackson et al. |
| 2004/0220861 A1 | 11/2004 | Morciniec et al. |
| 2004/0267674 A1 | 12/2004 | Feng et al. |
| 2005/0015303 A1 | 1/2005 | Dubin et al. |
| 2005/0055283 A1 | 3/2005 | Zarovinsky |
| 2005/0060270 A1 | 3/2005 | Ramakrishnan |
| 2005/0065965 A1 | 3/2005 | Ziemann et al. |
| 2005/0075915 A1 | 4/2005 | Clarkson |
| 2005/0075941 A1 | 4/2005 | Jetter et al. |
| 2005/0086122 A1 | 4/2005 | Cirulli et al. |
| 2005/0086125 A1 | 4/2005 | Cirulli et al. |
| 2005/0096122 A1 | 5/2005 | Nireki et al. |
| 2005/0096963 A1 | 5/2005 | Myr et al. |
| 2005/0102175 A1 | 5/2005 | Dudat et al. |
| 2005/0102192 A1 | 5/2005 | Gerrits et al. |
| 2005/0102227 A1 | 5/2005 | Solonchev |
| 2005/0114270 A1 | 5/2005 | Hind et al. |
| 2005/0131764 A1 * | 6/2005 | Pearson et al. ................. 705/26 |
| 2005/0165659 A1 | 7/2005 | Gruber |
| 2005/0171825 A1 | 8/2005 | Denton et al. |
| 2005/0228786 A1 | 10/2005 | Murthy et al. |
| 2006/0020512 A1 | 1/2006 | Lucas et al. |
| 2006/0036507 A1 | 2/2006 | Pujar et al. |
| 2006/0112099 A1 | 5/2006 | Musgrove et al. |
| 2007/0050272 A1 | 3/2007 | Godlewski et al. |
| 2007/0234201 A1 | 10/2007 | Fukura et al. |
| 2008/0082374 A1 | 4/2008 | Kennis et al. |
| 2009/0240737 A1 | 9/2009 | Hardisty et al. |

FOREIGN PATENT DOCUMENTS

| | | |
|---|---|---|
| WO | WO 99/45450 A2 | 9/1999 |
| WO | WO 01/71635 A2 | 9/2001 |

OTHER PUBLICATIONS

Abraham et al., "An Implemented System for Improving Promotion Productivity Using Store Scanner Data", Marketing Science, Summer 1993, vol. 12, No. 3, pp. 248-269.

Anon., "(A Lot of) Life After H. Ross: Electronic Data Systems", *Financial World*, vol. 162, No. 22, Nov. 9, 1993 (p. 50(2)).

"Beyond Markdown Management", summer/autumn 03, the 4caster, Issue 4, vol. 2, 4 pages.

Brown, "The Effects of Assortment Composition Flexibility on Operating Efficiency", (Abstract Only), *Dissertation Abstracts Int'l.*, vol. 55/08-A, available at least by 1994, (p. 2458).

"Retailers Manage Markdown Challenges Using i2 Solutions", Jan. 13, 2003, NRF 92nd Annual Convention & Expo, 2 pages.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Jensen et al., "Long-Term Construction Contracts: The Impact of Tamra '88 on Revenue Recognition", *Journal of Construction Education*, Spring 1997, vol. 2, No. 1, pp. 37-53.

Kelkar et al., Price Modeling in Standards for Electronic Product Catalogs Based on XML, 2002, pp. 366-375.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Srinivasan et al., Concepts and strategy guidelines for designing value enhancing sales promotions, Journal of Product and Brand Management, vol. 7, No. 5, 1998, pp. 410-420.

Subrahmanyan et al., "Developing optimal pricing and inventory policies for retailers who face uncertain demand", Journal of Retailing, vol. 72, No. 1, Spring, 1996, 15 pages.

Wilson, "Changing the Process of Production", *Industrial Management*, vol. 37, No. 1, Jan./Feb. 1995 (pp. 1-2).

Okuda et al., Abstract for "Development of Gantt Chart Viewer with XML Interface", vol. 1, 2001, 1 page.

* cited by examiner

SYSTEM AND METHOD FOR IDENTIFYING ELEMENT USAGE IN A DEEP ELEMENT STRUCTURE

BACKGROUND OF THE INVENTION

The present invention relates generally to the field of identifying usage for an element within a deep element structure. More specifically, the present invention relates to a system and method for identifying usage of an element including both direct and indirect usage of the element, the element being associated with a structure where the element may have more than one parent element.

Large numbers of data elements may be created where each data element represents a discrete item, concept, class of items, etc. The data elements may be associated with a plurality of data element fields to create a deep element structure. Within a deep element structure, the data elements and data element fields may have been created over time, by a different set of users, represent a wide variety of objects, etc. such that a variety of structures may be associated with the data element and/or the data element fields.

It may be necessary to apply a plurality of rules to a large number of the data elements despite the different type of data elements and/or data element fields. The rules may result in the generation of new data elements directly using the original data elements. These new data elements may be further used by additional data elements such that these additional elements indirectly use the original data element, etc. Accordingly, modification to any particular element may have a complex effect on any data structure having a deep element structure.

Searches or queries showing usage are used in a variety of applications from Web searches to "where used" searches in development tools. Query results are displayed in a list format which limits the scope of the listing to objects that directly use the object for which the query was performed.

What is needed is a system and method for implementing queries to identify usage of a data element associated with a deep element structure, including both direct and indirect usage. What is further needed is such a system and method including a user interface configured to allow the user to easily identify data elements that may be affected by changes to a data element. What is further needed is such a user interface that is configurable to allow the user to customize their usage search.

SUMMARY OF THE INVENTION

One embodiment of the invention relates to a system for identifying usage of a target data element including both direct and indirect usage, within a data element structure where the target data element may have more than one parent data element. The system includes a usage processing engine configure to identify direct and indirect usage data elements for the target data element within the data element structure and a user interface configured to display the direct and indirect usage data elements for the target element in a hierarchical structure.

Another embodiment of the invention relates to a method for identifying usage of a target data element including both direct and indirect usage, within a data element structure where the target data element may have more than one parent data element. The method includes receiving a target data element identifier, identifying direct usage data elements for the target data element within the data element structure, identifying indirect usage data elements for the target data element within the data element structure, and displaying the direct and indirect usage data elements for the target element in a hierarchical structure.

Yet another embodiment of the invention relates to a system for identifying usage of a target data element including both direct and indirect usage, within a data element structure where the target data element may have more than one parent data element. The system includes a memory queue configured to receive and store a listing of data elements, each data element including a plurality of data element fields and representing one or more software elements within a software workbench. The system further includes a usage processing engine configure to identify direct and indirect usage data elements for the target data element within the data element structure and a user interface configured to display the direct and indirect usage data elements for the target element in a hierarchical structure.

This summary and the following detailed description are directed to certain specific embodiments of the invention. The invention is not limited to the particular embodiments and applications described herein. The invention is defined only by the claims.

DETAILED DESCRIPTION OF THE PREFERRED EMBODIMENTS

Figure 1:
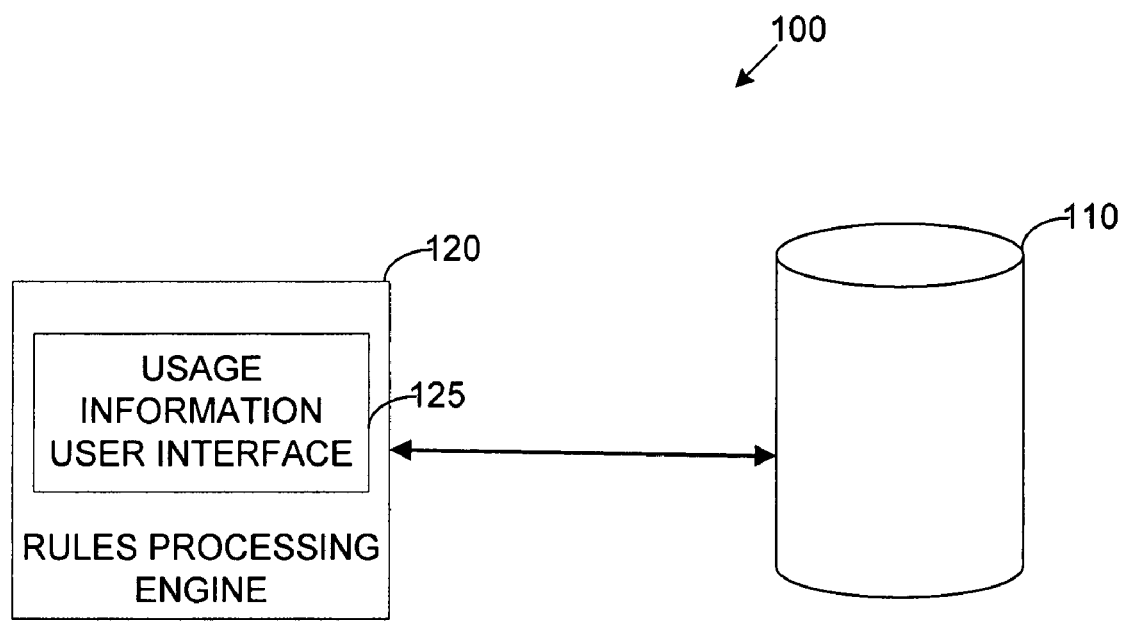
FIG. 1 is a system for allowing a user to identify data elements that use a target data element, either directly or indirectly, according to an exemplary embodiment.

Referring to FIG. 1, a system 100 for allowing a user to identify data elements that use a target data element, either directly or indirectly, is shown, according to an exemplary embodiment. An data element may be any of a wide variety of data element types, such as a database entry, a computing process, a part listed in a bill of materials, a product within a store/warehouse, an object within a logistic chain, or any other element within a deep element structure that may belong to more than one parent element, either directly or indirectly.

A data element that accesses or otherwise utilizes a target element may be referred to as a parent element. Utilization may including linking to a data element, utilizing the data element in one or more calculations, utilizing information associated with the data element, etc.

System 100 includes a data repository 110 and a usage processing engine 120. Although a particular configuration of system 100 is shown, system 100 may be implemented using a single processing system and data repositories, a plurality of processing systems, a plurality of databases, etc. to perform the functions described herein. System 100 may further be configured to include more, fewer, and/or a different configuration of components to perform the functions described herein.

Data repository 110 may be any database or other collection of data configured to store large amounts of data elements in an deep element data structure. Data repository 110 may be configured to implement standard database functionality, including but not limited to, storage of data elements, retrieval of data elements, data element sorting, etc. Data repository 110 may be implemented using RAM, ROM, one or more hard drives, or any other type of memory device. An exemplary database may be a database of a data elements where each data elements is representative of an article or type of article for sale in a retail setting. Other data elements may include entries in a table, computer records, products, a product class, etc. Each data element may be configured to include one or more data element fields. Exemplary data element fields may include information associated with the particular element. According to the exemplary embodiment, the data element fields may be information related to the article for sale such as an identification number, a description, a color, pricing information, markdown information, etc. Although a database is described, data elements may alternatively be stored in a table, a linked list, or using any other large data storage system or method.

According to another exemplary embodiment, data repository 110 may be representative of computer code, composed of a plurality of rules and actions, software elements, etc. created and/or implemented using a software workbench system. Software elements can be discrete sections of code for implementing a rule or an action in software. Data repository 110 may be configured to include data fields including parameters affecting the operation of each rule and/or action. Data repository 110 may be configured such that rules and/or actions may utilize other rules and/or actions as input and/or output parameters.

Usage processing engine 120 may be any type of processor configured to implement one or more usage determination rules to determine usage patterns among the data elements stored in data repository 110. Usage processing engine 120 is further configure to display and provide functionality associated with a usage information user interface 125 configured to receive input information and display results of a usage query.

User interface 125 may be any computer-implemented user interface configured to receive one or more user inputs and display usage information generated by usage processing engine 120. User interface 125 may further be configured to receive one or more inputs from a user allowing the user to customize the usage query being processed. The user interface and its configuration is discussed in further detail below with reference to FIGS. 2 and 3.

Figure 2:
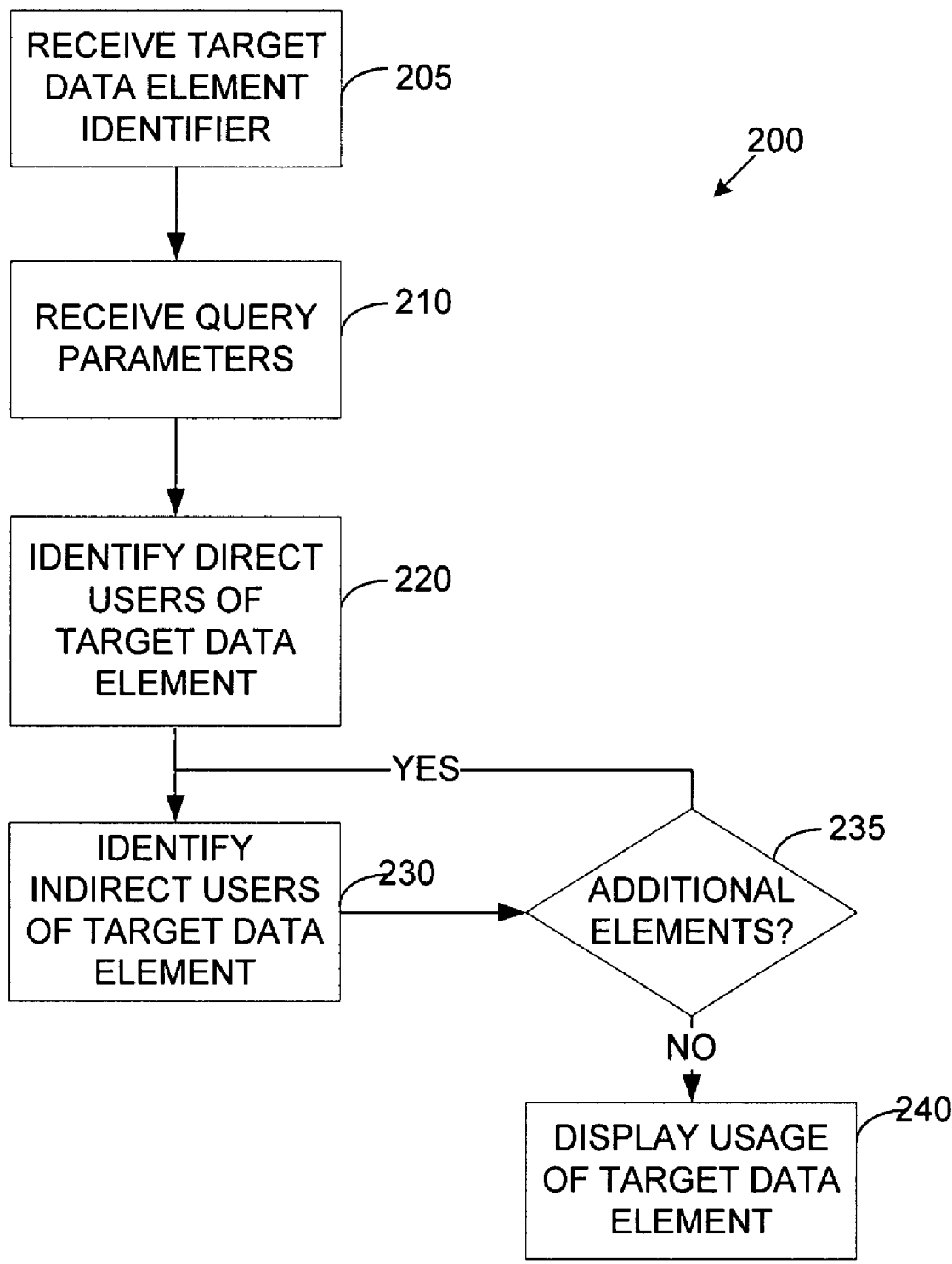
FIG. 2 is a flowchart illustrating a method for determining direct and indirect usage of a data element stored in a deep element structure where data elements may be associated with more than one parent data elements, according to an exemplary embodiment
Figure 3:
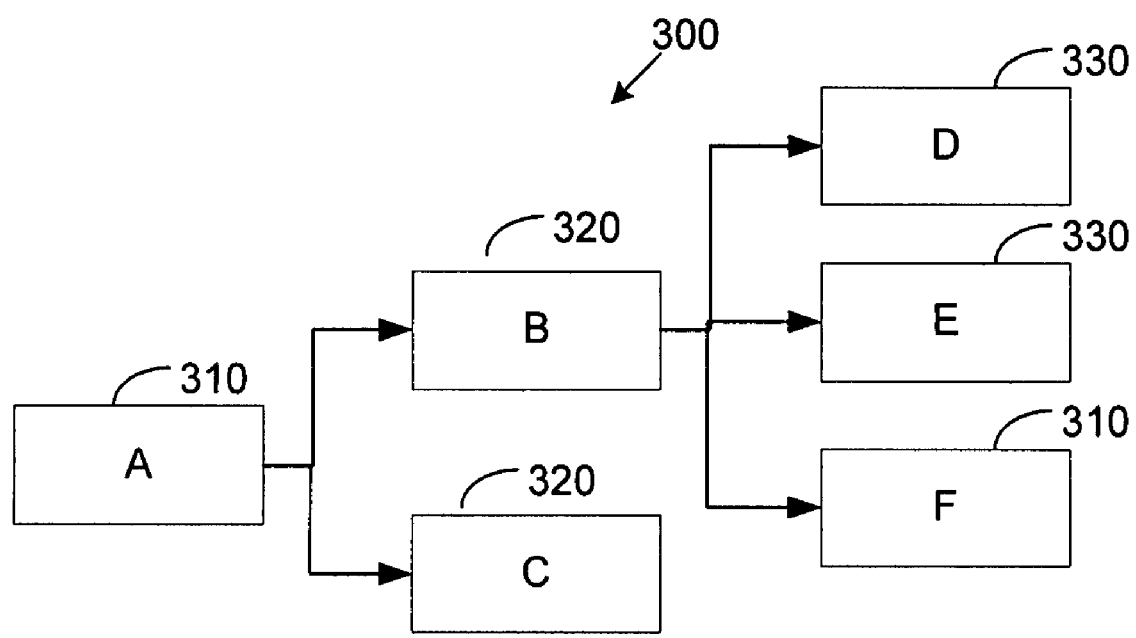
FIG. 3 is a "where used" query result chart in diagrammatical form, according to an exemplary embodiment.

Referring now to FIG. 2, a flowchart 200 illustrating a method for determining direct and indirect usage of a data element stored in a deep element structure where data elements may be associated with more than one parent data elements is shown, according to an exemplary embodiment. Although specific steps are shown and described as being performed in a specific order, it should be understood that the method may include more, fewer, and/or a different configuration of steps to implement the method described herein.

In a step 205, a user is prompted through user interface 125 to enter a target data element identifier. The identifier may be a unique identification number, a name, a stock keeping unit (SKU) number, etc. The identifier may be manually entered by the user, selected from a listing, automatically selected based on a parameter, etc.

In a step 210, the user may optionally enter one or more query parameters. One exemplary search parameter may include a query depth parameter. If the user does not select any query parameters, the query can be implemented using a set of default parameters.

One exemplary parameter of a query parameter may be a query depth parameter. The query depth parameter may be an indication of the number of data elements that indirectly use the target data element are search and/or shown. For example, referring now to FIG. 3, a "where used" query result chart 300 in diagrammatical form is shown, according to an exemplary embodiment. Chart 300 includes a target data element 310, direct usage data elements 320, and indirect usage data elements 330. All of the data elements 320 and 330 are valid results to a "where used" query. Direct usage data elements 320 are elements that access the target data element 310 directly without having to call or access any other data elements, however, where a user has selected a query depth parameter of one, only direct usage data elements 320 would be displayed in a results screen. Although not shown in FIG. 3, a data element may be both a direct and an indirect usage data element.

Another exemplary parameter may be a data element type. For example, a user may wish to only identify data elements that are static elements that need to be updated and not data elements that are computer programs that would automatically be updated the next time they were executed. Accordingly, user interface 125 may be configured such that a user can restrict the query to only return results of a defined data element type.

Yet another exemplary parameter may be a end user data element identification. The user may wish to identify all intermediate data elements that use the target data element for the end user data element is the final user. For example, a user may wish to identify all data elements used by a program that access a target data element.

Referring again to FIG. 2, following identification of the target data element and selection of parameters by the user, processing engine 120 may be configured to search a data element database to identify direct users of the target data element in a step 220. The identification of direct users may be accomplished through text searching of code, text search of program logs, object types, name pattern, name, description, etc. The direct data elements may be stored in linked list of data elements.

Following identification of the direct data elements 320, processing engine may be configured to identify direct users of the data elements 320, to create a linked list of data elements 330 in a step 230. In generating the listing of indirect users, processing engine 120 may be configured to iteratively implement step 210, treating each data element in the output of step 210 as the target data element and identifying all of each direct target elements direct users. Processing engine 120 may be configured for more or less refinement in identifying indirect users. For example, a less refined identification scheme identifies all direct users of the data elements in the listing formed in step 210 (i.e. the direct users of the direct usage data elements 310), while a more refined identification scheme includes identifying how each of the data elements in the listing formed in step 210 is used and whether this usage involves the target data element 310. For example, a computer program (indirect usage data element) may access a database (direct usage data element) that has a field linked to the target data element. This computer program would always be identified as a indirect usage data element using the less refined approach, but may not be identified as such if the computer program only utilizes a portion of the database that does not include the target data element using the more refined identification scheme. Processing engine 120 may be configured to generate a linked list of the indirect data element.

Step 230 may be iteratively repeated until a stop condition is reached. Stop conditions can include a lack of parent elements, reaching the query depth level entered by the user, detection of an infinite loop, etc. A determination is made in a step 235 whether additional elements exist. If so, step 230 is repeat, if not, the method conclude with a reporting step 240.

Figure 4A:
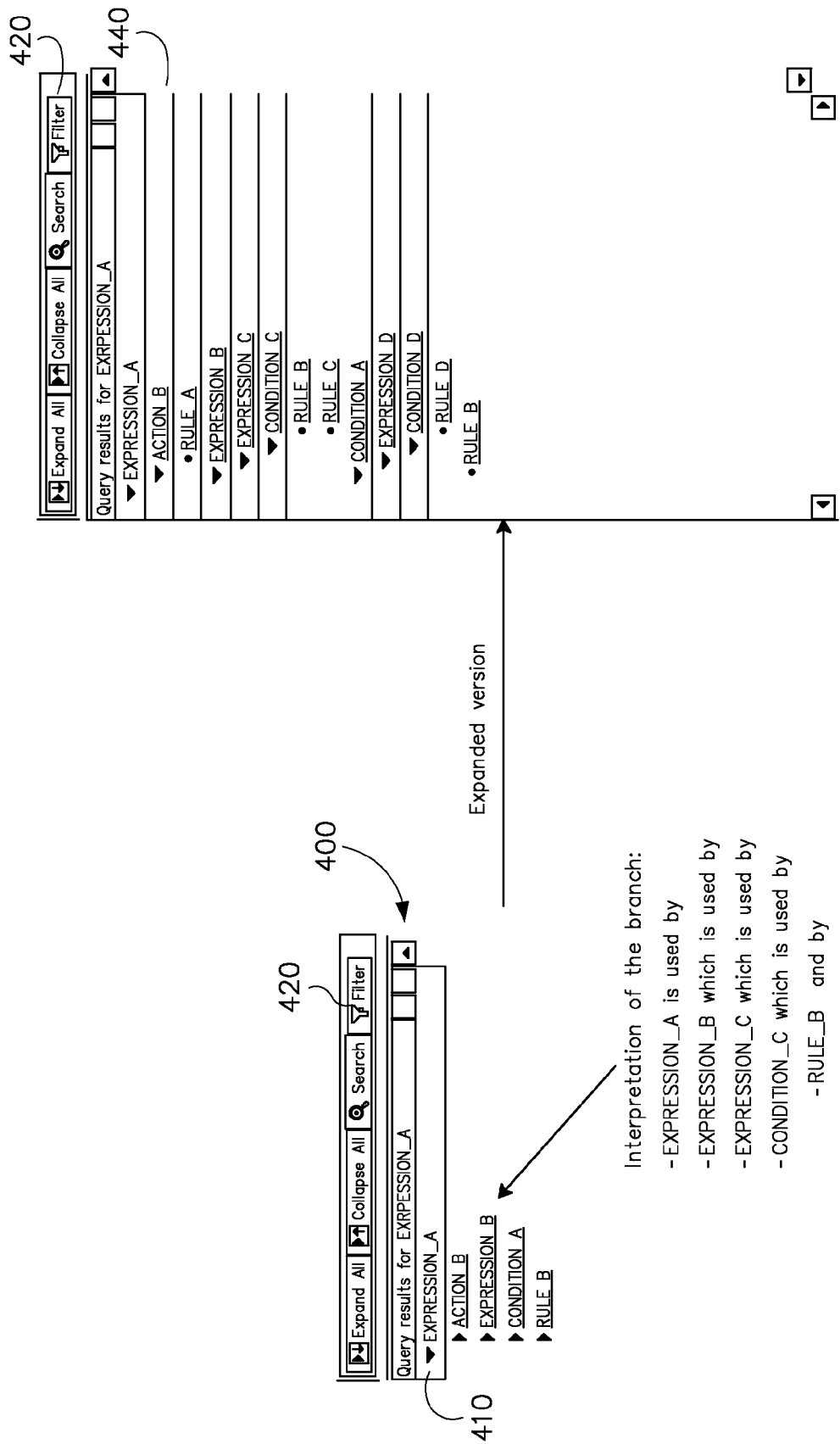
FIGS. 4A-4C are screen shots representative of usage results displayed on a user interface, according to an exemplary embodiment.

In step 240, the results of step 220 and 230 may be displayed to the user using user interface 125. Referring now to FIG. 4A, the results may be displayed in an interactive results display screen 400 in a tree structure 410 that is intuitively understandable to the user. Screen 400 may include a plurality of buttons 420 allowing the user to customize how the results are displayed. Exemplary buttons 420 may include buttons to expand or collapse the tree structure to display more or less detail, a search button allowing a user to search for a particular data element, field, etc., a filter button to allow the user to select a subset of the data elements shown in tree structure 410, etc. The buttons may be configurable by the user depending on desired functionality. The available buttons may also vary based on whether the buttons are applicable to the current display.

The tree structure 410 may display all data element types. Each data element displayed in tree structure 410 may be a link to the actual objects allowing the user to navigate directly to them.

Figure 4B:
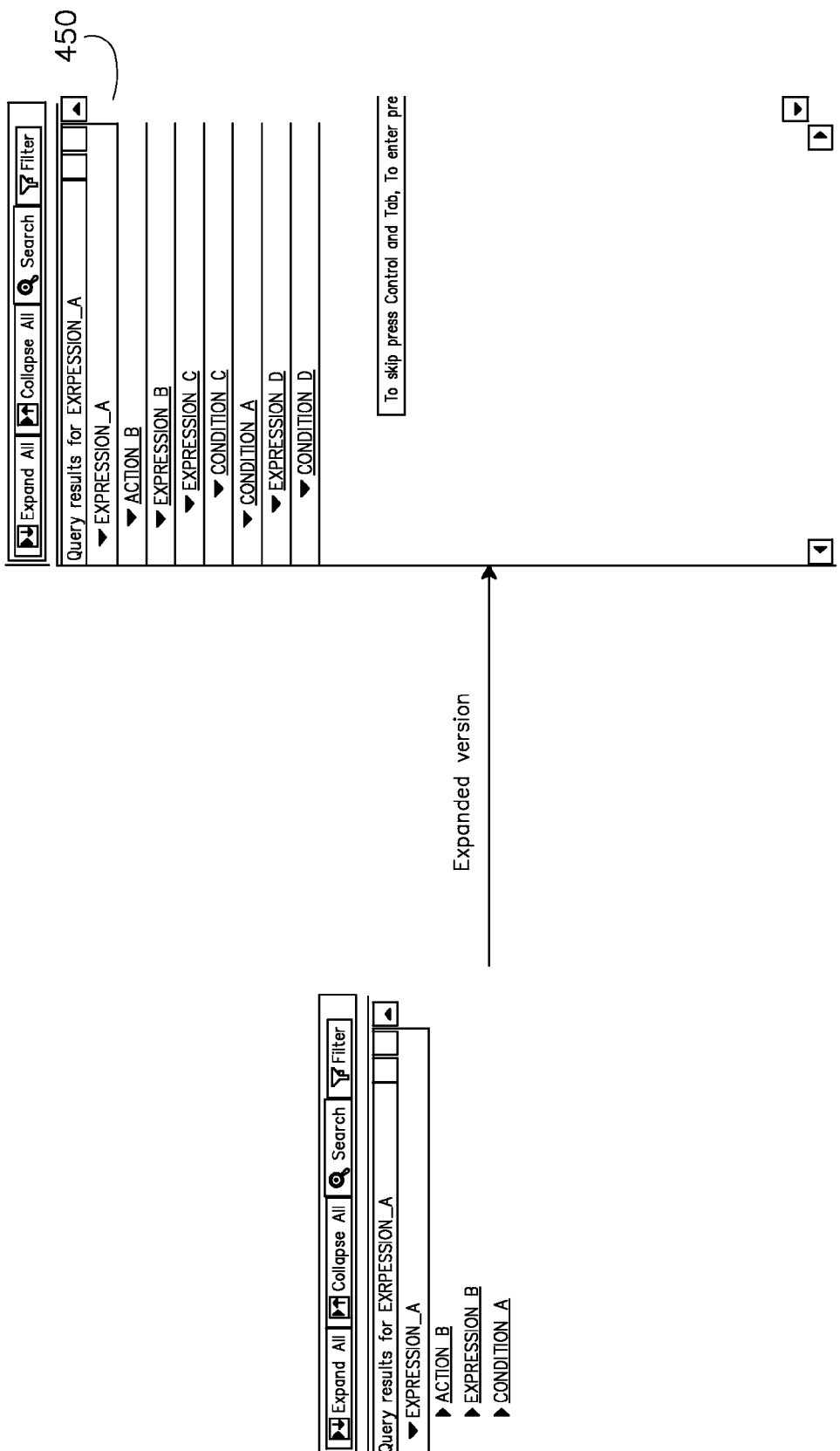
Figure 4C:

The tree structure shown in results display 400 may be configured to offer a wide range of functionality, for example, clicking on the "Expand All" button on display 400 may cause the display to reconfigure to display an expanded version of display 440, as shown in FIG. 4A. Searching on a search result of "EXPRESSION_A" with search configuration set such that rules are excluded may result in a display screen 450, as shown in FIG. 4B. Searching on a search result of "EXPRESSION_A" with search configuration set such that only rules are included may result in a display screen 460, as shown in FIG. 4C.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of a process, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A system for identifying usage of a target data element within a data element structure, the system comprising:
   a usage processing engine configured to identify a first plurality of usage data elements and a second plurality of usage data elements associated with the target data element within the data element structure, wherein identifying the first plurality of usage data elements includes identifying usage data elements that directly use the target data element within the data element structure, and wherein identifying the second plurality of usage data elements includes identifying usage data elements that indirectly use the target data element within the data element structure; and
   a user interface configured to display the identified first plurality of usage data elements and the second plurality of usage data elements associated with the target data element in a hierarchical structure.

2. The system of claim 1, wherein the user interface is configured to allow a user to enter at least one query input parameter allowing the user to customize a usage query being processed by the usage processing engine.

3. The system of claim 2, wherein the at least one query input parameter includes a data element type parameter, wherein the data element type parameter is associated with a data element type.

4. The system of claim 1, wherein identifying the second plurality of usage data elements includes identifying all direct usage data elements for direct usage data elements associated with the target data element.

5. The system of claim 1, wherein identifying the second plurality of usage data elements includes identifying direct usage data elements for direct usage data elements associated with the target data element that would be affected by a change in the target data element.

6. The system of claim 1, wherein the first plurality of usage data elements and the second plurality of usage data elements displayed in the user interface include links allowing the user to access and manipulate the usage data elements.

7. The system of claim 1, wherein identifying the first plurality of usage data elements and the second plurality of usage data elements associated with the target data element includes identifying only those elements associated with a single particular indirect usage data element.

8. A method for identifying usage of a target data element within a data element structure, the method comprising:
   receiving, from a user interface, a target data element identifier;
   identifying a first plurality of usage data elements associated with the target data element within the data element structure, wherein identifying the first plurality of usage data elements includes identifying usage data elements that directly use the target data element within the data element structure;
   identifying, using a usage processing engine, a second plurality of usage data elements associated with the target data element within the data element structures, wherein identifying the second plurality of usage data elements includes identifying usage data elements that indirectly use the target data element within the data element structure; and
   displaying in the user interface the identified first plurality of usage data elements and the second plurality of usage data elements associated with the target element in a hierarchical structure.

9. The method of claim 8, wherein the user interface is configured to allow a user to enter at least one query input parameter allowing the user to customize a usage query being processed by the usage processing engine.

10. The method of claim 9, wherein the at least one query input parameter includes a data element type parameter, wherein the data element type parameter is associated with a data element type.

11. The method of claim 8, wherein identifying the second plurality of usage data elements includes identifying all direct usage data elements for direct usage data elements associated with the target data element.

12. The method of claim 8, wherein identifying the second plurality of usage data elements includes identifying direct usage data elements for direct usage data elements associated with the target data element that would be affect by to a change in the target data element.

13. The method of claim 8, wherein displaying the first plurality of usage data elements and the second plurality of usage data elements includes providing links allowing the user to access and manipulate the usage data elements.

14. The method of claim 8, wherein identifying the first plurality of usage data elements and the second plurality of usage data elements associated with the target data element includes identifying only those elements associated with a single particular indirect usage data element.

15. A system for identifying usage of a target data element, within a data element structure, comprising:
   a memory queue configured to receive and store a listing of data elements, each data element including a plurality of data element fields and representing one or more software elements within a software workbench;
   a usage processing engine configured to identify a first plurality of usage data elements and a second plurality of usage data elements associated with the target data element within the data element structure, wherein identifying the first plurality of usage data elements includes identifying usage data elements that directly use the target data element within the data element structure, and wherein identifying the second plurality of usage data elements includes identifying usage data elements that indirectly use the target data element within the data element structure; and
   a user interface configured to display the identified first plurality of usage data elements and the second plurality of usage data elements associated with the target element in a hierarchical structure.

16. The system of claim 15, wherein the user interface is configured to allow a user to enter at least one query input parameter allowing the user to customize a usage query being processed by the usage processing engine.

17. The system of claim 16, wherein the at least one query input parameter includes a data element type parameter, wherein the data element type parameter is associated with a data element type.

18. The system of claim 15, wherein identifying the first plurality of usage data elements and the second plurality of usage data elements includes identifying all direct usage data elements for direct usage data elements associated with the target data element.

19. The system of claim 15, wherein identifying the first plurality of usage data elements and the second plurality of usage data elements includes identifying direct usage data elements for direct usage data elements associated with the target data element that would be affected by a change in the target data element.

20. The system of claim 15, wherein the first plurality of usage data elements and the second plurality of usage data elements displayed in the user interface include links allowing the user to access and manipulate the usage data elements.

21. The system of claim 15, wherein identifying the first plurality of usage data elements and the second plurality of usage data elements associated with the target data element includes identifying only those elements associated with a single particular indirect usage data element.

22. The system of claim 1, wherein each data element in the data element structure represents an article for sale in a retail environment.

23. The system of claim 8, wherein each data element in the data element structure represents an article for sale in a retail environment.

24. The system of claim 2, wherein at least one query input parameter includes a query depth parameter, wherein the query depth parameter represents an indication of a number of data elements that indirectly use the target data element.

25. The system of claim 9, wherein at least one query input parameter includes a query depth parameter, wherein the query depth parameter represents an indication of a number of data elements that indirectly use the target data element.

26. The system of claim 16, wherein at least one query input parameter includes a query depth parameter, wherein the query depth parameter represents an indication of a number of data elements that indirectly use the target data element.

* * * * *